(12) United States Patent
Azad et al.

(10) Patent No.: US 12,139,665 B1
(45) Date of Patent: Nov. 12, 2024

(54) RHEOLOGICAL GRADIENT-BASED METHOD OF RECOVERING OIL FROM HYDROCARBON-BEARING SUBTERRANEAN GEOLOGIC FORMATION

(71) Applicant: KING FAHD UNIVERSITY OF PETROLEUM AND MINERALS, Dhahran (SA)

(72) Inventors: Madhar Sahib Azad, Dhahran (SA); Dhafer Abdullah Al Shehri, Dhahran (SA); Assad Ahmed Abdallah Barri, Dhahran (SA); Jafar Sadiq Al Hamad, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/409,896

(22) Filed: Jan. 11, 2024

(51) Int. Cl.
*C09K 8/588* (2006.01)
*E21B 43/16* (2006.01)

(52) U.S. Cl.
CPC ............ *C09K 8/588* (2013.01); *E21B 43/168* (2013.01)

(58) Field of Classification Search
CPC ...... C09K 8/588; C09K 8/68; C09K 2208/30; C09K 8/58; E21B 43/16; E21B 43/20; E21B 43/162
See application file for complete search history.

(56) References Cited

U.S. PATENT DOCUMENTS 3,398,094 A * 8/1968 Blatz .................... A62D 1/0035
166/275
4,395,340 A * 7/1983 McLaughlin ............. C08F 2/10
166/266
(Continued)

FOREIGN PATENT DOCUMENTS

CA 2592717 A1 * 12/2008 ............. E21B 21/06
RU 2 136 862 C1 9/1999

OTHER PUBLICATIONS

Santvoort et al.; Viscoelastic surfactants for diversion control in oil recovery; Journal of Petroleum and Science and Engineering 135; Oct. 28, 2015; 7 Pages.
(Continued)

*Primary Examiner* — Zakiya W Bates
(74) *Attorney, Agent, or Firm* — Oblon, McClelland, Maier & Neustadt, L.L.P.

(57) ABSTRACT

A method of recovering oil from a hydrocarbon-bearing subterranean geologic formation includes producing a first hydrocarbon composition and injecting a first injection fluid including a first viscoelastic polymer and a first brine solution. The first viscoelastic polymer has a shear viscosity from 500 to 700 cP at a shear rate of 0.5 to 2 s$^{-1}$. A second hydrocarbon composition is produced and a second injection fluid including a viscous polymer and a second brine solution is injected. The viscous polymer has a shear viscosity greater than the first viscoelastic polymer. Further, a third hydrocarbon composition is produced and a third injection fluid including a second viscoelastic polymer and a third
(Continued)

brine solution is injected. The second viscoelastic polymer has a shear viscosity less than the viscous polymer. The method further includes producing a fourth hydrocarbon composition.

20 Claims, 9 Drawing Sheets

(56) References Cited

U.S. PATENT DOCUMENTS

| | | |
|---|---|---|
| 6,828,280 B2 | 12/2004 | England et al. |
| 7,550,413 B2 | 6/2009 | Huang et al. |
| 11,268,014 B2 | 3/2022 | Trivedi et al. |
| 2021/0025275 A1 | 1/2021 | Azad et al. |

OTHER PUBLICATIONS

Firozjaii et al. ; Review on chemical enhanced oil recovery using polymer flooding: Fundamentals, experimental and numerical simulation ; Petroleum 6 ; Sep. 25, 2019 ; 8 Pages.

\* cited by examiner

RHEOLOGICAL GRADIENT-BASED METHOD OF RECOVERING OIL FROM HYDROCARBON-BEARING SUBTERRANEAN GEOLOGIC FORMATION

STATEMENT OF ACKNOWLEDGEMENT

Support provided by the College of Petroleum Engineering & Geosciences, King Fahd University of Petroleum and Minerals, Saudi Arabia and start-up project SF21007 is gratefully acknowledged.

BACKGROUND

Technical Field

The present disclosure is directed to processes and techniques for crude oil recovery, and particularly, to a method for improving the recovery performance of a polymer-flood using a rheological gradient approach.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Generally, oil recovery from conventional reservoirs can be classified into three stages—primary, secondary, and tertiary. During primary recovery, oil is recovered owing to the natural energy of the reservoir, such as solution gas drive mechanisms, gas cap drive mechanisms, and water drive mechanisms. During primary recovery, the natural pressure of the reservoir or gravity drive oil into the wellbore, combined with artificial lift techniques (such as pumps), bring oil to the surface; however, only about 10 percent of a reservoir's original oil is typically recovered during primary recovery. After a time, it no longer continues to be economically beneficial to proceed with the primary recovery methods (natural pressure and/or gravity). During secondary recovery, water or gas is injected into the depleted reservoir so that pressure is maintained across the reservoir for an adequate flow of oil toward the producer. Secondary recovery techniques and methods extend the productive life of an oil field and/or well by injecting water and/or gas to displace oil and drive it to a production wellbore, resulting in an average recovery of 20 to 40 percent of the original oil. After a time, it no longer continues to be economically beneficial to proceed with the secondary recovery techniques (water and/or gas floods). Secondary recovery techniques are performed after primary recovery techniques. An injection slug should be of adequate viscosity so that mobility of the injection slug relative to the mobility of oil is not high enough to cause unnecessary fingering, and a reduced sweep. The injection slug should possess higher interfacial activity with the oil so that the trapping capillary force can be kept in the lower ranges; however, the conventional water flood doesn't have the sufficient interfacial activity or viscosity. Enhanced oil recovery (EOR) methods are generally employed in the tertiary mode to recover the oil that could not be recovered by preceding water flood (secondary recovery). Although EOR methods are generally classified into thermal, gas, and chemical methods based on the nature of the injection fluids, they may also be classified as mobilization and mobility control methods based on the mechanisms by which the methods recover the oil in the water-flooded reservoir. Mobility control methods provide adequate viscosity to the injection slugs thereby, the flow is reduced so that a greater amount of oil may be contacted/swept. Further, mobility control methods are generally applied when the oil has a higher viscosity.

Polymer flood is one of the most applied EOR methods employed to improve the recovery factor in depleted oil reservoirs. A polymer flood helps to increase recovery by providing better mobility control and an enhanced sweep. However, polymer solutions with large viscoelastic characteristics were reported to reduce residual oil saturation in favorable conditions. In polymer flood, a concentration gradient is employed to reduce viscous fingering effects during the switch from polymer to water flood. The concentration gradient imposes a varying mobility ratio, and therefore, ensures that sweep efficiency is not largely affected. Moreover, polymer solutions are expected to propagate at relatively lower fluxes in remote portions of the reservoir, and ideally, 1 ft/day is considered as a standard lab-flux rate. Rheologically, viscoelastic effects become more dominant at higher fluxes due to the time-scale effect [Azad, M. S. 2023. Characterization of non-linear viscoelastic properties of EOR polymer systems using steady shear rheometry. *SPE Journal*, 1-19. SPE 212824-PA]. At 1 ft/day, viscoelastic polymer solutions can recover more oil at the pressure gradient, which is comparable to or less than the corresponding viscous slug injections. The higher the pressure gradient, the higher the core-scale sweep. A better sweep is helpful for oil displacement. Hence, there is a need to understand if a polymer solution with higher viscosity is injected sequentially followed by a viscoelastic polymer solution injection will increase recovery and to understand the effect of performing sequential flooding by varying the rheology of the injection and/or injection slugs.

Accordingly, an object of the present disclosure is to provide a method for sequential flooding by varying the rheology of the injection by injecting a viscoelastic slug, preferably followed by a viscous slug, and then followed by the same viscoelastic slug. Further, it is an object of the present disclosure to describe the use of favorable gradient rheology on a primary polymer flood.

SUMMARY

In an exemplary embodiment, a method of recovering oil from a hydrocarbon-bearing subterranean geologic formation is described. The method includes producing a first hydrocarbon composition from the hydrocarbon-bearing subterranean geologic formation and injecting a first injection fluid including a first viscoelastic polymer and a first brine solution into the hydrocarbon-bearing subterranean geologic formation. The first viscoelastic polymer has a shear viscosity from 500 to 700 cP at a shear rate of 0.5 to 2 $s^{-1}$. The method further includes producing a second hydrocarbon composition from the hydrocarbon-bearing subterranean geologic formation and injecting a second injection fluid including a viscous polymer and a second brine solution into the hydrocarbon-bearing subterranean geologic formation. The viscous polymer has a shear viscosity greater than the first viscoelastic polymer. The method further includes producing a third hydrocarbon composition from the hydrocarbon-bearing subterranean geologic formation and injecting a third injection fluid including a second viscoelastic polymer and a third brine solution into the hydrocarbon-bearing subterranean geologic formation. The second viscoelastic polymer has a shear viscosity less than the viscous polymer. The method further includes producing a fourth hydrocarbon composition from the hydrocarbon-bearing subterranean geologic formation. In some embodiments, an oil recovery, according to the method of the present disclosure, is from 65 to 85 percent by weight based on an amount of the hydrocarbon composition present in the hydrocarbon-bearing subterranean geologic formation before the injection of the first injection fluid.

In some embodiments, injecting the first injection fluid occurs before the hydrocarbon-bearing subterranean geologic formation stops producing the first hydrocarbon composition.

In some embodiments, injecting the second injection fluid does not occur until the injection of the first injection fluid stops producing the second hydrocarbon composition.

In some embodiments, injecting the third injection fluid does not occur until the injection of the second injection fluid stops producing the third hydrocarbon composition.

In some embodiments, the hydrocarbon-bearing subterranean geologic formation is a Berea sandstone.

In some embodiments, the Berea sandstone has a permeability of 150 to 250 mD.

In some embodiments, the Berea sandstone has a porosity of 0.200 to 0.225.

In some embodiments, the first injection fluid, second injection fluid, and third injection fluid is injected in a slug size of 2 to 15 pore volumes (PVs).

In some embodiments, the injection occurs at 0.5 to 2 feet per day.

In some embodiments, the second viscoelastic polymer is the first viscoelastic polymer.

In some embodiments, the first brine solution, the second brine solution, and the third brine solutions include sodium chloride, sodium bicarbonate, sodium sulfate, potassium chloride, calcium chloride, and magnesium chloride.

In some embodiments, the first viscoelastic polymer is a first hydrolyzed polyacrylamide with a molecular mass of 10 to 30 MDa.

In some embodiments, the first hydrolyzed polyacrylamide has a concentration of 2500 to 3500 ppm in the first brine solution.

In some embodiments, the first viscoelastic polymer has a shear thickening index of 1.0 to 1.5 in the first brine solution.

In some embodiments, the viscous polymer is a second hydrolyzed polyacrylamide with a molecular mass of 2 to 5 MDa.

In some embodiments, the second hydrolyzed polyacrylamide has a concentration of 13,000 to 15,000 ppm in the second brine solution.

In some embodiments, the viscous polymer has a shear thickening index of less than 0.2 in the second brine solution.

In some embodiments, the first viscoelastic polymer is hydrolyzed polyacrylamide 3630.

In some embodiments, the viscous polymer is hydrolyzed polyacrylamide 3130.

These and other aspects of the non-limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1:
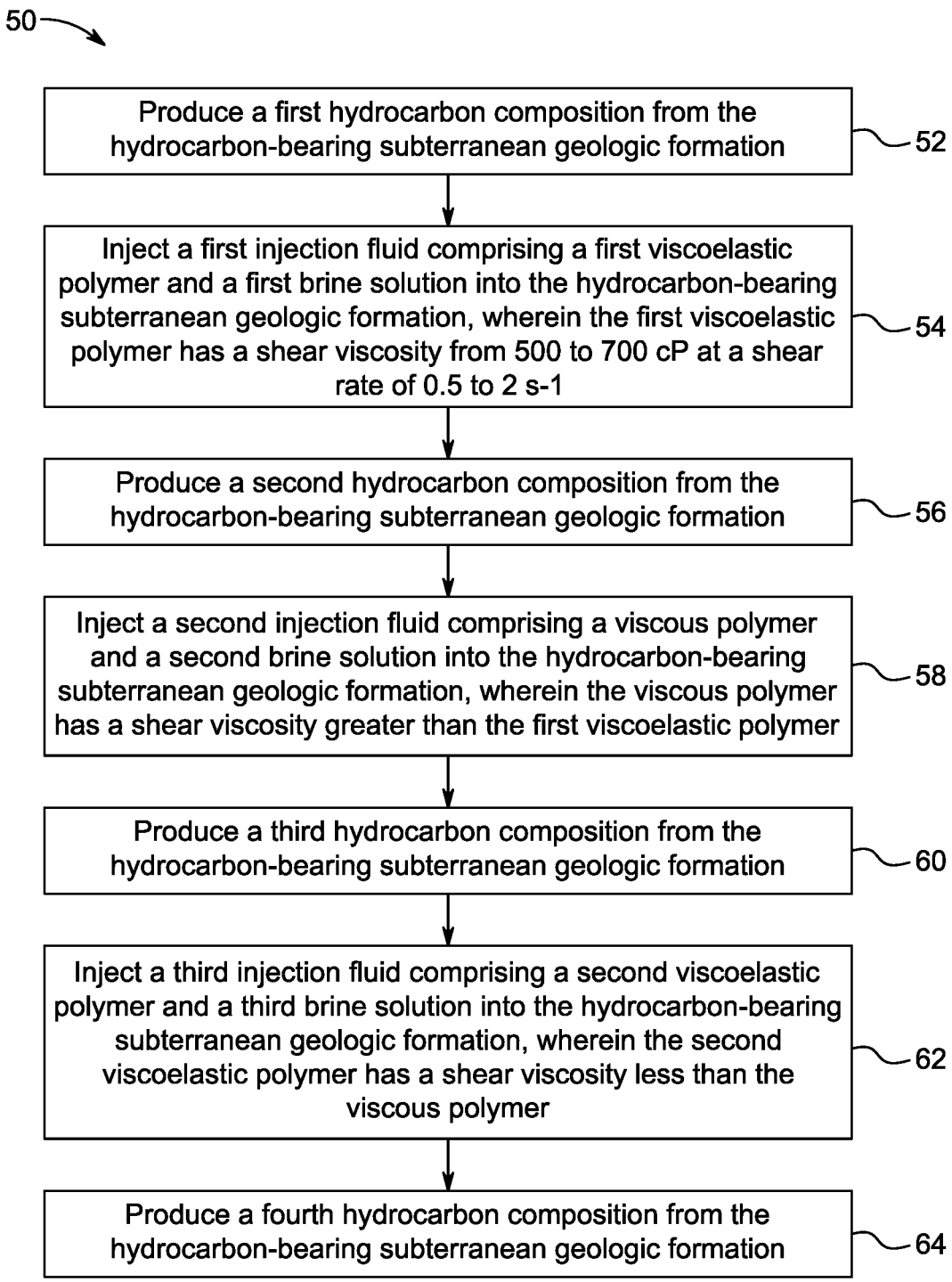
FIG. 1 is a schematic flow diagram of a method of recovering oil from a hydrocarbon-bearing subterranean geologic formation, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type. However, such references are merely exemplary in nature. It may be noted that any reference to elements in the singular may also be constructed to relate to the plural and vice-verse without limiting the scope of the disclosure to the exact number or type of such elements unless set forth explicitly in the appended claims. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

As used herein, the terms "reservoir," "oil reservoir," and "petroleum reservoir" refer to a component of a petroleum system (i.e., a hydrocarbon and/or petroleum-generating and storing geologic system) that is composed of a subsurface body of rock formations having sufficient porosity and permeability to store and transmit fluids. A reservoir is a subsurface (subterranean) accumulation of hydrocarbons contained in porous or fractured rock formations. A reservoir can contain oil and gas. Sedimentary rocks are the most common reservoir rocks because they have greater porosity than most igneous and metamorphic rocks. Sedimentary rocks also form under temperature conditions at which hydrocarbons can be preserved. Depending on the type of sedimentary rock, reservoirs can be classified as carbonate reservoirs, having predominantly limestone, or sandstone reservoirs, having primarily siliciclastic rocks and clay. In general, carbonate reservoirs tend to have lower primary permeability and salinity compared to sandstone reservoirs.

As used herein, the term "permeability" refers to the ability or measurement of a reservoir rock's ability to transmit fluids and is typically measured in darcy (d) or millidarcy (md). Permeability is a property of porous materials that is an indication of the ability for fluids (gas or liquid) to flow through them. Formations that transmit fluids readily, such as sandstones, are described as permeable and tend to have many large, well-connected pores. Sandstones may be said to have high permeability as fluids can more easily flow through the material. Impermeable formations tend to be finer-grained or of a mixed-grain size, with smaller, fewer, and/or less interconnected pores. As used herein, a "low-permeability reservoir" refers to an oil reservoir having a range of permeability that is no higher than 10 md, preferably 0.05-10 md, more preferably 0.1-7.5 md, even more preferably 0.5-5 md, and most preferably 1-5 md. Accordingly, as used herein, a "high-permeability reservoir" refers to an oil reservoir having a range of permeability that is higher than 10 md. Permeability is related to the porosity, shape of the pores in the medium, and the level of connectedness of the pores. Pores may have a varying pore size, pore size distribution, and pore morphology, such as pore shape and surface roughness. The pores may be made up of a network of interconnected channels.

As used herein, the term "porosity" refers to the percentage, fraction, or ratio of void (empty) space to the pore volume (PV) of a rock. Porosity may also refer to the total volume within the rock that can contain or hold fluids, which is typically no more than 20 to 25% for both sandstone and carbonate reservoirs. "Total porosity" is the total void space in the rock, whether or not it contributes to fluid flow. "Effective porosity" is the ratio of the volume of interconnected pores/pore spaces to the total volume. Thus, the value for effective porosity is typically less than the value for total porosity.

As used herein, the term "pore volume" refers to the total volume in a reservoir that can be occupied by fluids. This term is also used as a measurement unit referring to the amount of fluid, such as chemical fluid or water, and/or gas that is injected into a reservoir during secondary and tertiary recoveries.

As used herein, the term "enhanced oil recovery," "EOR," or "tertiary oil recovery" refers to a technique for increasing the amount of hydrocarbons that may be extracted from a "hydrocarbon-bearing formation" or "formation." Enhanced oil recovery is performed after a formation or reservoir has already go through a primary stage of oil recovery and a secondary stage of oil recovery. The primary stage of oil recovery followed by the secondary stage of recovery extracts 10 to 40% of oil available in a formation. Primary and secondary stages of recovery rely on a pressure differential between an outer surface of the formation and an underground portion of the formation.

As used herein, "shear thinning index" can be calculated by dividing the value of apparent viscosity at the lowest speed by the value of apparent viscosity at the highest speed (typically at 2 rpm and 20 rpm or 5 rpm and 50 rpm). The resultant ratio is an index of shear thinning.

Aspects of the present disclosure are directed at improving the recovery factor of a secondary polymer flood using a rheological gradient-based approach. In this method, initially, a viscoelastic polymer solution (first slug) with large elasticity (viscoelastic slug) is injected into an oil-saturated core until the viscoelastic polymer solution doesn't produce any oil. The oil-saturated core is not producing any oil when a production rate is less than 10 percent, preferably less than 8 percent, preferably less than 5 percent, preferably less than 2 percent, more preferably less than 1 percent, and yet more preferably less than 0.5 percent of an initial production rate. The initial production rate is a rate of production measured 24 hours after the first slug is injected. In some embodiments, the initial production rate is a rate of production measured after 6 to 96 hours, preferably 12 to 72 hours, preferably 18 to 48 hours, more preferably 20 to 36 hours, and yet more preferably about 24 hours after the first slug is injected. In some embodiments, the initial production rate is measured 24 hours after the oil-saturated core produces oil after the first slug is injected. Then, a polymer solution (second slug) with large viscosity but negligible elasticity (viscous slug) is injected, until the polymer solution doesn't produce any additional oil. The oil-saturated core is not producing any oil when a production rate is less than 10 percent, preferably less than 8 percent, preferably less than 5 percent, preferably less than 2 percent, more preferably less than 1 percent, and yet more preferably less than 0.5 percent of a secondary production rate. The secondary production rate is a rate of production measured 24 hours after the second slug is injected. In some embodiments, the secondary production rate is a rate of production measured after 6 to 96 hours, preferably 12 to 72 hours, preferably 18 to 48 hours, more preferably 20 to 36 hours, and yet more preferably about 24 hours after the second slug is injected. In some embodiments, the secondary production rate is measured 24 hours after the oil-saturated core produces oil after the second slug is injected. In some examples, a formation is not producing any additional oil when the recovery percentage is constant for a pore volume injection of at least 1, i.e., 1 PV. As used herein, "constant" refers to a change in value of less than 1, preferably less than 0.5, preferably less than 0.2, preferably less than 0.1, preferably less than 0.05, and preferably less than 0.01. The change in value may be a numerical value, a percentage, and the like.

In some embodiments, a formation is not producing any additional oil when less than 0.5% of oil is recovered after an additional PV (1 PV) injection. Then, a second amount of the first slug with higher elasticity but lower viscosity is reinjected into the core as the third slug, until the third slug doesn't produce any further oil. The injection of a viscoelastic slug followed by a viscous slug and then by the same viscoelastic slug induces a rheological gradient that ensures an adequate sweep and micro-displacement of well-swept oil, and results in increased oil recovery.

Generally, subterranean geologic formations, such as carbonate reservoirs (e.g., predominantly limestone) or sandstone reservoirs (e.g., primarily siliciclastic rocks and clay) contain a mixture of hydrocarbons of widely varying molecular weight. In some embodiments, the hydrocarbon is an oil. The oil may be one or more of crude oil, petroleum oil, shale oil, fossil oil, biomass-derived oil, a combination thereof, and any oil known in the art.

Referring to FIG. 1, a flow chart of a method 50 of recovering oil from a hydrocarbon-bearing subterranean geologic formation, is illustrated. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure.

At step 52, the method 50 includes producing a first hydrocarbon composition from the hydrocarbon-bearing subterranean geologic formation. The first hydrocarbon composition may be obtained by injecting an oil recovery composition into a wellbore connected to the reservoir and then collecting hydrocarbons from the same wellbore. The oil recovery composition may be any composition that is conventionally known in the art. In some embodiments, the injection may be performed manually, or it may be automatic, for example, by using chemical injection pumps. The chemical injection pump(s) can be automatically or manually controlled to inject any amount of the oil recovery formulation needed for secondary and/or tertiary oil recovery operations. In some embodiments, the oil recovery composition may be a brine solution. The oil recovery composition displaces the hydrocarbons in the hydrocarbon-bearing subterranean geologic formation to form the first hydrocarbon composition.

The amount of oil recovery formulation injected may vary depending on the well set-up, the formation type, the type of oil to be displaced, the type of recovery (e.g., secondary versus tertiary), the oil recovery desired, and many other factors. An oilfield technician of ordinary skill can determine the appropriate amount of the oil recovery formulation to inject to suit a particular recovery operation. In an embodiment, the oil is extracted from Berea sandstone; however, the method of the present disclosure may be adapted to other subterranean geologic formations as well, albeit with a few variations, as may be obvious to a person skilled in the art. The Berea sandstone has a permeability of 150 to 250 mD, preferably 155 to 245 mD, preferably 160 to 240 mD, preferably 165 to 235 mD, preferably 170 to 230 mD, preferably 175 to 225 mD, preferably 180 to 220 mD, preferably 185 to 215 mD, preferably 190 to 210 mD, or preferably 195 to 205 mD. In some embodiments, the Berea sandstone has a permeability of about 172 mD, about 199 mD, and/or about 210 mD. The Berea sandstone has a porosity of 0.200 to 0.225, preferably 0.201 to 0.224, preferably 0.202 to 0.223, preferably 0.203 to 0.222, preferably 0.204 to 0.221, preferably 0.205 to 0.220, preferably 0.206 to 0.219, preferably 0.207 to 0.218, preferably 0.208 to 0.217, preferably 0.209 to 0.216, preferably 0.210 to 0.215, preferably 0.211 to 0.214, or preferably 0.212 to 0.213. In some embodiments, the Berea sandstone has a porosity of about 0.207, about 0.209, about 0.210, and/or about 0.219.

At step 54, the method 50 includes injecting a first injection fluid comprising a first viscoelastic polymer and a first brine solution into the hydrocarbon-bearing subterranean geologic formation. The first injection fluid, optionally in combination with at least a portion of the first hydrocarbon composition, is injected into the hydrocarbon-bearing subterranean geologic formation before the hydrocarbon-bearing subterranean geologic formation stops producing the first hydrocarbon composition. The hydrocarbon-bearing subterranean geologic formation stops producing the first hydrocarbon composition when a production rate is less than 10 percent, preferably less than 8 percent, preferably less than 5 percent, preferably less than 2 percent, more preferably less than 1 percent, and yet more preferably less than 0.5 percent of an initial production rate. The initial production rate is a rate of production of the first hydrocarbon composition measured 24 hours after the first injection fluid is injected into the hydrocarbon-bearing subterranean geological formation. In some embodiments, the initial production rate is a rate of production of the first hydrocarbon composition measured after 6 to 96 hours, preferably 12 to 72 hours, preferably 18 to 48 hours, more preferably 20 to 36 hours, and yet more preferably about 24 hours after the first injection fluid is injected into the hydrocarbon-bearing subterranean geological formation. In some embodiments, the initial production rate is measured 24 hours after the hydrocarbon-bearing subterranean geologic formation produces the first hydrocarbon composition after the first injection fluid is injected into the hydrocarbon-bearing subterranean geological formation. In some embodiments, the first injection fluid, optionally in combination with at least a portion of the first hydrocarbon composition, is injected into the hydrocarbon-bearing subterranean geologic formation after the hydrocarbon-bearing subterranean geologic formation stops producing the first hydrocarbon composition. The first injection fluid may be preferably injected as slugs (pre-determined volume of the first injection fluid), or it may be injected continuously. In an embodiment, the first injection fluid is injected in a slug size of 2 to 15 pore volumes (PVs), preferably 3 to 14 PVs, preferably 4 to 13 PVs, preferably 5 to 12 PVs, preferably 6 to 11 PVs, preferably 7 to 10 PVs, preferably 8 to 9 PVs, and all ranges between. Pore volume is the total volume of the pores or void spaces in a reservoir rock that contains fluid (i.e., the hydrocarbon-bearing subterranean geologic formation). The pore volume of the hydrocarbon-bearing subterranean geological formation may be estimated based on oil production of the subterranean geological formation. The pore volume of a hydrocarbon-bearing subterranean geologic formation may be estimated when the saturation of fluids in a porous network is known, referred to as a hydrocarbon pore volume. The pore volume of the hydrocarbon-bearing subterranean geological formation may be calculated by using volumetric data. For example, if an area, thickness, and porosity of the hydrocarbon-bearing subterranean geological formation is known, a pore volume of the hydrocarbon-bearing subterranean geological formation is determined as one pore volume (1 PV) (i.e., the units may be in cubic feet or barrels). Hydrocarbon pore volume may be determined from the geological (area and average thickness) and petrophysical (porosity and net to gross—NTG) input. In an embodiment, the first injection fluid is injected at a depth of at 0.5 to 2 feet per day, preferably 0.6 to 1.8 feet per day, preferably 0.7 to 1.5 feet per day, preferably 0.8 to 1.2 feet per day, more preferably 0.9 to 1.1 feet per day, and yet more preferably about 1 foot per day. In some embodiments, the slug size and the frequency of injection, may vary depending on the depth at which the first injection fluid is injected into the hydrocarbon-bearing subterranean geologic formation.

The first injection fluid includes a first viscoelastic polymer and a first brine solution. Suitable examples of the first viscoelastic polymers include amorphous polymers, semicrystalline polymers, biopolymers, metals at very high temperatures, and bitumen materials. In an embodiment, the first viscoelastic polymer is first hydrolyzed polyacrylamide, which may be used alone or in combination with other conventionally known viscoelastic polymers. In a preferred embodiment, the first viscoelastic polymer is first hydrolyzed polyacrylamide, or more specifically hydrolyzed polyacrylamide 3630. The first viscoelastic polymer has a shear viscosity from 500 to 700 cP, preferably 525 to 675 cP, preferably 550 to 650 cP, and more preferably 575 to 625 cP at a shear rate of 0.5 to 2 s$^{-1}$. More specifically, the first viscoelastic polymer has a shear viscosity of 602.48 cP, 136.67 cP, and 87.02 cP at shear rates of 1.17 s$^{-1}$, 12.7 s$^{-1}$, and 28.1 s$^{-1}$.

Parameters that affect the oil recovery are concentration and molecular weight of the first viscoelastic polymer. It is preferred that the molecular weight of the first viscoelastic polymer is in the range of 10-30 MDa, preferably 11-29 MDa, preferably 12-28 MDa, preferably 13-27 MDa, preferably 14-26 MDa, preferably 15-25 MDa, preferably 16-24 MDa, preferably 17-23 MDa, preferably 18-22 MDa, more preferably 19-21 MDa, and yet more preferably about 20 MDa. In some embodiments, the molecular weight of the first viscoelastic polymer may be higher than 30 MDa, or less than 10 MDa.

In some embodiments, the concentration of the first viscoelastic polymer, preferably first hydrolyzed polyacrylamide, in the first brine solution is in the range of 2500 to 3500 ppm, preferably 2550 to 3450 ppm, preferably 2600 to 3400 ppm, preferably 2650 to 3350 ppm, preferably 2700 to 3300 ppm, preferably 2750 to 3250 ppm, preferably 2800 to 3200 ppm, preferably 2850 to 3150 ppm, preferably 2900 to 3100 ppm, more preferably 2950 to 3050 ppm, and yet more preferably about 3000 ppm, and all ranges in between. However, in some embodiments, the concentration of the first viscoelastic polymer, preferably first hydrolyzed polyacrylamide, in the first brine solution can be in the range of 1000 to 2000 ppm, preferably 1100 to 1900 ppm, preferably 1200 to 1800 ppm, preferably 1300 to 1700 ppm, or preferably 1400 to 1600 ppm. At higher concentrations, the first viscoelastic polymer was found to be less elastic to penetrate into the pores of the hydrocarbon-bearing subterranean geologic formation. When the concentration of the first viscoelastic polymer was in the range of 2500 to 3500 ppm and the molecular weight in the range of 10-30 MDa, the first viscoelastic polymer has a shear thickening index of 1.0 to 1.5, preferably 1.1 to 1.4, and preferably 1.2 to 1.3, in the first brine solution. In an embodiment, when the concentration of the first viscoelastic polymer is about 3000 ppm and the molecular weight is about 20 MDa, the first viscoelastic polymer has a shear thickening index of about 1.22. The first brine solution may be commercially procured or may be prepared by mixing sodium chloride, sodium bicarbonate, sodium sulfate, potassium chloride, calcium chloride, and magnesium chloride in defined weight percentages. In some embodiments, the first brine solution may comprise any ionic salt known in the art. In some embodiments, the first brine solution may have a total concentration in a range of 4600 to 5200 mg/L, preferably 4700 to 5100 mg/L, preferably 4800 to 5000 mg/L, more preferably 4850 to 4950 mg/L, and yet more preferably about 4907 mg/L.

At step 56, the method 50 includes producing a second hydrocarbon composition from the hydrocarbon-bearing subterranean geologic formation. The second hydrocarbon composition may be the same or different from the first hydrocarbon composition. In some embodiments, it may be possible that the second hydrocarbon composition includes crude oils having higher molecular weight compounds in comparison to the first hydrocarbon composition. This may be because the second hydrocarbon composition is obtained at a depth greater than the first hydrocarbon composition, yielding oils of a higher density. In some embodiments, the oil recovery is from 65 to 85 percent by weight (wt. %), preferably about 67 to 73 wt. %, preferably 70 to 72.5 wt. %, based on the amount of the hydrocarbon composition present in the hydrocarbon-bearing subterranean geologic formation before the injection of the first injection fluid.

At step 58, the method 50 includes injecting a second injection fluid comprising a viscous polymer and a second brine solution into the hydrocarbon-bearing subterranean geologic formation. The second injection fluid does not occur until the injection of the first injection fluid stops producing the second hydrocarbon composition. In other words, the second injection fluid is injected into the hydrocarbon-bearing subterranean geologic formation only after the first injection fluid stops producing the second hydrocarbon composition. The hydrocarbon-bearing subterranean geologic formation stops producing the second hydrocarbon composition when a production rate is less than 10 percent, preferably less than 8 percent, preferably less than 5 percent, preferably less than 2 percent, more preferably less than 1 percent, and yet more preferably less than 0.5 percent of a secondary production rate. The secondary production rate is a rate of production of the second hydrocarbon composition measured 24 hours after the second injection fluid is injected into the hydrocarbon-bearing subterranean geological formation. In some embodiments, the secondary production rate is a rate of production of the second hydrocarbon composition measured after 6 to 96 hours, preferably 12 to 72 hours, preferably 18 to 48 hours, more preferably 20 to 36 hours, and yet more preferably about 24 hours after the second injection fluid is injected into the hydrocarbon-bearing subterranean geological formation. In some embodiments, the secondary production rate is measured 24 hours after the hydrocarbon-bearing subterranean geologic formation produces the second hydrocarbon composition after the second injection fluid is injected into the hydrocarbon-bearing subterranean geological formation. The second injection fluid may be preferably injected as slugs (predetermined volume of the third injection fluid), or it may be injected continuously. In an embodiment, the second injection fluid is injected in a slug size of 2 to 15 pore volumes (PVs), preferably 3 to 14 PVs, preferably 4 to 13 PVs, preferably 5 to 12 PVs, preferably 6 to 11 PVs, preferably 7 to 10 PVs, preferably 8 to 9 PVs, and all ranges between.

The second injection fluid includes a viscous polymer and a second brine solution. The viscous polymer has a greater shear viscosity than the first viscoelastic polymer. In some embodiments, the second viscous polymer is a second hydrolyzed polyacrylamide with a molecular mass of 2 to 5 MDa, preferably 3 to 4 MDa, preferably 3.1 to 3.9 MDa, preferably 3.3 to 3.8 MDa, more preferably 3.5 to 3.7, and more preferably about 3.6 MDa. The second hydrolyzed polyacrylamide has a concentration of 13,000 to 15,000 ppm, preferably 13,100 to 14,900 ppm, preferably 13,200 ppm to 14,800 ppm, preferably 13,300 to 14,700 ppm, preferably 13,400 to 14,600 ppm, preferably 13,500 to 14,500 ppm, preferably 13,600 to 14,400 ppm, preferably 13,700 to 14,300 ppm, preferably 13,800 to 14,200 ppm, more preferably 13,900 to 14,100 ppm, yet more preferably about 14000 ppm, and all ranges in between, in the second brine solution. In a preferred embodiment, the viscous polymer is hydrolyzed polyacrylamide 3130. The viscous polymer has a shear thickening index of less than 0.2, preferably less than 0.1, preferably less than 0.05, in the second brine solution and a shear viscosity greater than the first viscoelastic polymer. The second brine solution may be commercially procured or may be prepared by mixing sodium chloride, sodium bicarbonate, sodium sulfate, potassium chloride, calcium chloride, and magnesium chloride in defined weight percentages. In some embodiments, the second brine solution may be the same or different than the first brine solution. In some embodiments, the second brine solution may comprise any ionic salt known in the art. In some embodiments, the second brine solution may have a total concentration in a range of 4600 to 5200 mg/L, preferably 4700 to 5100 mg/L, preferably 4800 to 5000 mg/L, more preferably 4850 to 4950 mg/L, and yet more preferably about 4907 mg/L.

At step 60, the method 50 includes producing a third hydrocarbon composition from the hydrocarbon-bearing subterranean geologic formation. The third hydrocarbon composition may be same or different from the first hydrocarbon composition and the second hydrocarbon composition. In some embodiments, it may be possible that the third hydrocarbon composition includes crude oils having higher molecular weight compounds in comparison to the first hydrocarbon composition and the second hydrocarbon composition. This may be because the third hydrocarbon composition is obtained at a depth greater than the first hydrocarbon composition and the second hydrocarbon composition, yielding oils in a higher density. In some embodiments, the oil recovery is from 65 to 85 percent by weight, preferably about 70 to 82 wt. %, preferably 72 to 80 wt. %, more preferably 75 to 80 wt. %, and more preferably 77 to 79 wt. % based on the amount of the hydrocarbon composition present in the hydrocarbon-bearing subterranean geologic formation before the injection of the first injection fluid.

At step 62, the method 50 includes injecting a third injection fluid comprising a second viscoelastic polymer and a third brine solution into the hydrocarbon-bearing subterranean geologic formation. The third injection fluid does not occur until the injection of the second injection fluid stops producing the third hydrocarbon composition, i.e., the third injection fluid is injected into the hydrocarbon-bearing subterranean geologic formation only after the second injection fluid stops producing the third hydrocarbon composition. The third injection fluid is injected into the hydrocarbon-bearing subterranean geologic formation after the second injection fluid stops producing the third hydrocarbon composition. The hydrocarbon-bearing subterranean geologic formation stops producing the third hydrocarbon composition when a production rate is less than 10 percent, preferably less than 8 percent, preferably less than 5 percent, preferably less than 2 percent, more preferably less than 1 percent, and yet more preferably less than 0.5 percent of a tertiary production rate. The tertiary production rate is a rate of production of the third hydrocarbon composition measured 24 hours after the third injection fluid is injected into the hydrocarbon-bearing subterranean geological formation. In some embodiments, the tertiary production rate is a rate of production of the third hydrocarbon composition measured after 6 to 96 hours, preferably 12 to 72 hours, preferably 18 to 48 hours, more preferably 20 to 36 hours, and yet more preferably about 24 hours after the third injection fluid is injected into the hydrocarbon-bearing subterranean geological formation. In some embodiments, the initial production rate is measured 24 hours after the hydrocarbon-bearing subterranean geologic formation produces the third hydrocarbon composition after the third injection fluid is injected into the hydrocarbon-bearing subterranean geological formation. In some embodiments, the third injection fluid may be injected into the hydrocarbon-bearing subterranean geologic formation before the second injection fluid stops producing the third hydrocarbon composition. The third injection fluid may be preferably injected as slugs (pre-determined volume of the third injection fluid), or it may be injected continuously. In an embodiment, the third injection fluid is injected in a slug size of 2 to 15 pore volumes (PVs), preferably 3 to 14 PVs, preferably 4 to 13 PVs, preferably 5 to 12 PVs, preferably 6 to 11 PVs, preferably 7 to 10 PVs, or preferably 8 to 9, PVs, and all ranges between.

The third injection fluid includes a second viscoelastic polymer and a third brine solution. In an embodiment, the third viscoelastic polymer is first hydrolyzed polyacrylamide, which may be used alone or in combination with other conventionally known viscoelastic polymers. In a preferred embodiment, the second viscoelastic polymer is first hydrolyzed polyacrylamide, or more specifically hydrolyzed polyacrylamide 3630. The second viscoelastic polymer is same as the first viscoelastic polymer and has a shear viscosity less than the viscous polymer. The third brine solution may be commercially procured or may be prepared by mixing sodium chloride, sodium bicarbonate, sodium sulfate, potassium chloride, calcium chloride, and magnesium chloride in defined weight percentages. In some embodiments, the third brine solution may be the same or different than the first brine solution and/or the second brine solution. In some embodiments, the third brine solution may comprise any ionic salt known in the art. In some embodiments, the third brine solution may have a total concentration in a range of 4600 to 5200 mg/L, preferably 4700 to 5100 mg/L, preferably 4800 to 5000 mg/L, more preferably 4850 to 4950 mg/L, and yet more preferably about 4907 mg/L.

At step 64, the method 50 includes producing a fourth hydrocarbon composition from the hydrocarbon-bearing subterranean geologic formation. The fourth hydrocarbon composition may be same or different from the first hydrocarbon composition, the second hydrocarbon composition, and the third hydrocarbon composition. In some embodiments, the oil recovery is from 65 to 85 percent by weight, preferably about 70 to 84 wt. %, preferably 75 to 83 wt. %, more preferably 82 to 83 wt. %, and yet more preferably about 82.7 wt. %, and all ranges in between, based on the amount of the hydrocarbon composition present in the hydrocarbon-bearing subterranean geologic formation before the injection of the first injection fluid.

In some embodiments, the first injection fluid, the second injection fluid, and/or the third injection fluid may include one or more additives selected from the group consisting of a foaming agent, a gelling agent, a pH control agent, a breaker, an oxidizing breaker, a gel stabilizer, a fluid loss control additive, a clay stabilizer, a corrosion inhibitor, a crosslinking agent, a scale inhibitor, a catalyst, a surfactant, a preservative, a biocide, a thermal stabilizer, the like, and a combination thereof. Typically, when present, the additive(s) may be incorporated in an amount of up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, or preferably up to 0.01 wt. %, based on a total weight of the first injection fluid, the second injection fluid, and/or the third injection fluid.

Additive(s) suitable for use in oil and gas well operations, and particularly during oil recovery operations, are known by those of ordinary skill in the art, and may include, but are not limited to, viscosity modifying agents e.g., bauxite, bentonite, dolomite, limestone, calcite, vaterite, aragonite, magnesite, taconite, gypsum, quartz, marble, hematite, limonite, magnetite, andesite, garnet, basalt, dacite, nesosilicates, orthosilicates, sorosilicates, cyclosilicates, inosilicates, phyllosilicates, tectosilicates, kaolins, montmorillonite, fullers earth, halloysite, polysaccharide gelling agents (e.g., xanthan gum, scleroglucan, and diutan), synthetic gelling agents (e.g., polyacrylamides and co-polymers thereof, psyllium husk powder, hydroxyethyl cellulose, carboxymethylcellulose, and polyanionic cellulose, poly(diallyl amine), diallyl ketone, diallyl amine, styryl sulfonate, vinyl lactam, laponite, combinations thereof, and any viscosity modifying agents known in the art.

The first injection fluid, the second injection fluid, and/or the third injection fluid may also optionally include one or more surfactants. As used herein, "surfactant" refers to a chemical compound that decreases the surface tension or interfacial tension between two liquids, a liquid and a gas, or a liquid and a solid. The surfactant(s), when present, may be included in an amount of up to 5 wt. %, preferably up to 4 wt. %, preferably up to 3 wt. %, preferably up to 2 wt. %, preferably up to 1 wt. %, preferably up to 0.5 wt. %, preferably up to 0.1 wt. %, preferably up to 0.05 wt. %, or preferably up to 0.01 wt. %, based on a total weight of the oil recovery formulation. Cationic, anionic, non-ionic, and/or amphoteric surfactants may be employed herein.

Cationic surfactants may include, but are not limited to, a protonated amine formed from a reaction between a $C_6$-$C_{26}$ alkyl amine compound (e.g., protonated salts of $C_6$-$C_{26}$ alkyl monoamines, $C_6$-$C_{26}$ alkyl (poly)alkylene polyamines, alkoxylated fatty amines, and the like) and an acid (e.g., acetic acid, formic acid, propionic acid, butyric acid, pentanoic acid, hexanoic acid, oxalic acid, malonic acid, lactic acid, glyceric acid, glycolic acid, malic acid, citric acid, benzoic acid, p-toluenesulfonic acid, trifluoromethanesulfonic acid, hydrochloric acid, nitric acid, phosphoric acid, sulfuric acid, hydrobromic acid, perchloric acid, hydroiodic acid, and the like); a protonated $C_6$-$C_{26}$ alkyl amidoamine formed from a reaction between a $C_6$-$C_{26}$ alkyl amidoamine compound and an acid (the acids listed above, for example), such as protonated forms of the amide reaction product between any fatty acid (or ester derivative thereof) with a polyamine (e.g., putrescine, cadaverine, ethylene diamine, $N^1,N^1$-dimethylethane-1,2-diamine, $N^1,N^1$-dimethylpropan-1,3-diamine, $N^1,N^1$-diethylethane-1,2-diamine, $N^1,N^1$-diethylpropane-1,3-diamine, spermidine, 1,1,1-tris(aminomethyl)ethane, tris(2-aminoethyl)amine, spermine, TEPA, DETA, TETA, AEEA, PEHA, HEHA, dipropylene triamine, tripropylene tetramine, tetrapropylene pentamine, pentapropylene hexamine, hexapropylene heptamine, dibutylene triamine, tributylene tetramine, tetrabutylene pentamine, pentabutylene hexamine, hexabutylene heptamine, and the like), with mention being made to protonated forms of stearamidopropyldimethylamine, stearamidopropyldiethylamine, stearamidoethyldiethylamine, stearamidoethyldimethylamine, palmitamidopropyl dimethylamine, palmitamidopropyl diethylamine, palmitamidoethyl diethylamine, palmitamidoethyldimethylamine, behenamidopropyl dimethylamine, behenamidopropyl diethylmine, behenamidoethyl diethylamine, behenamidoethyl dimethylamine, arachidamidopropyl dimethylamine, arachidamidopropyl diethylamine, arachidamidoethyl diethylamine, and arachidamidoethyl dimethylamine; and a quaternary ammonium compound made from alkylation with suitable alkylating agents (e.g., dimethyl sulfate, methyl chloride or bromide, benzyl chloride or bromide, $C_6$-$C_{26}$ alkyl chloride or bromide, and the like) of a tertiary $C_6$-$C_{26}$ alkyl amine, an alkoxylated (tertiary) amine, or an aprotic nitrogenous heteroarene (optionally substituted) having at least one aromatic nitrogen atom with a reactive lone pair of electrons, with mention being made to a tri-fatty alkyl lower alkyl ammonium compound (e.g., trioctyl methyl ammonium chloride), a $C_{10}$-$C_{18}$ alkyl trimethyl ammonium chloride or methosulfate, a di-$C_{10}$-$C_{18}$ alkyl dimethyl ammonium chloride or methesulfate, a $C_{10}$-$C_{18}$ alkyl benzyl dimethyl ammonium chloride, a methyl quaternized $C_6$-$C_{22}$ alkyl propylene diamine, a methyl quaternized $C_6$-$C_{22}$ alkyl propylene triamine, a methyl quaternized $C_6$-$C_{22}$ alkyl propylene tetraamine, a N—$C_{10}$-$C_{18}$ alkyl pyridinium or a quinolinium bromide or chloride such as N-octyl pyridinium bromide, N-nonyl pyridinium bromide, N-decyl pyridinium bromide, N-dodecyl pyridinium bromide, N-tetradecyl pyridinium bromide, N-dodecyl pyridinium chloride, N-cyclohexyl pyridinium bromide, naphthyl methyl quinolinium chloride, naphthyl methyl pyridinium chloride, cetylpyridinium chloride, and the like as well as mixtures thereof.

Anionic surfactants may include, but are not limited to, sulfates, such as alkyl sulfates, alkyl-ester-sulfates, alkyl ether sulfates, alkyl-alkoxy-ester-sulfate, sulfated alkanolamides, glyceride sulfates, in particular, sulfates of fatty alcohols or polyoxyalkylene ethers of fatty alcohols, such as sodium dodecyl sulfate, sodium laureth sulfate, ammonium lauryl sulfate, potassium lauryl sulfate, sodium myreth sulfate; sulfonates, such as alkyl sulfonates, fatty alkyl-benzene sulfonates, lower alkyl-benzene sulfonates, alpha olefin sulfonates, lignosulfonates; sulfo-carboxylic compounds, for example, dodecyl benzene sulfonate, dioctyl sodium sulfosuccinate, perfluorooctanesulfonate (PFOS), perfluorobutanesulfonate; phosphates, such as alkyl acyl ether phosphates, alkyl ether phosphates, phosphates of fatty alcohols or polyoxyalkylene ethers of fatty alcohols such as cetyl phosphate salts, dicetyl phosphate salts, ceteth-10-phosphate salts; carboxylate salts of fatty acids, acylamino acids, lactylates, and/or fatty alcohols/polyoxyalkylene ethers of fatty alcohols such as sodium stearate, vegetable oil-based anionic surfactants (e.g., palm oil anionic surfactant), sodium behenoyl lactylate, sodium isostearoyl lactylate, sodium caproyl lactylate, sodium laureth-5 carboxylate, sodium laureth-6 carboxylate, sodium laureth-11 carboxylate, the like, and mixtures thereof.

Non-ionic surfactants may include, but are not limited to, amides or alkanolamides of fatty acids, that is, amide reaction products between a fatty acid and an amine or alkanolamine compound, such as coconut fatty acid monoethanolamide (e.g., N-methyl coco fatty ethanol amide), coconut fatty acid diethanolamide, oleic acid diethanolamide, palm based oleylamine, and vegetable oil fatty acid diethanolamide; alkoxylated alkanolamides of fatty acids, preferably ethoxylated and/or propoxylated variants of the alkanolamides of fatty acids using, for example, anywhere from 2 to 30 EO and/or PO molar equivalents, preferably 3 to 15 EO and/or PO molar equivalents, preferably 4 to 10 EO and/or PO molar equivalents, or preferably 5 to 8 EO and/or PO molar equivalents per moles of the alkanolamide of the fatty acid (e.g., coconut fatty acid monoethanolamide with 4 moles of ethylene oxide); amine oxides, such as N-cocoamidopropyl dimethyl amine oxide and dimethyl $C_6$-$C_{22}$ alkyl amine oxide (e.g., dimethyl coco amine oxide); fatty esters, such as ethoxylated and/or propoxylated fatty acids (e.g., castor oil with 2 to 40 moles of ethylene oxide), alkoxylated glycerides (e.g., PEG-24 glyceryl monostearate), glycol esters and derivatives, monoglycerides, polyglyceryl esters, esters of polyalcohols, and sorbitan/sorbitol esters; ethers, such as (i) alkoxylated $C_1$-$C_{22}$ alkanols, which may include alkoxylated $C_1$-$C_5$ alkanols, preferably ethoxylated or propoxylated $C_1$-$C_5$ alkanols (e.g., dipropylene glycol n-butyl ether, tripropylene glycol n-butyl ether, dipropylene glycol methyl ether, tripropylene glycol methyl ether, diethylene glycol n-butyl ether, triethylene glycol n-butyl ether, diethylene glycol methyl ether, triethylene glycol methyl ether) and alkoxylated $C_6$-$C_{26}$ alkanols (including alkoxylated fatty alcohols), preferably alkoxylated $C_7$-$C_{22}$ alkanols, more preferably alkoxylated $C_8$-$C_{14}$ alkanols, preferably ethoxylated or propoxylated (e.g., cetyl stearyl alcohol with 2 to 40 moles of ethylene oxide, lauric alcohol with 2 to 40 moles of ethylene oxide, oleic alcohol with 2 to 40 moles of ethylene oxide, ethoxylated lanoline derivatives, laureth-3, ceteareth-6, ceteareth-11, ceteareth-15, ceteareth-16, ceteareth-17, ceteareth-18, ceteareth-20, ceteareth-23, ceteareth-25, ceteareth-27, ceteareth-28, ceteareth-30, isoceteth-20, laureth-9/myreth-9, and PPG-3 caprylyl ether); (ii) alkoxylated polysiloxanes; (iii) ethylene oxide/propylene oxide copolymers (e.g., PPG-1-PEG-9-lauryl glycol ether, PPG-12-buteth-16, PPG-3-buteth-5, PPG-5-buteth-7, PPG-7-buteth-10, PPG-9-buteth-12, PPG-12-buteth-16, PPG-15-buteth-20, PPG-20-buteth-30, PPG-28-buteth-35, and PPG-33-buteth-45); and (iv) alkoxylated alkylphenols; alkyl polyglycosides (APGs), such as those made from reaction between fatty alcohols and glucose; and mixtures thereof. Amphoteric surfactants may include, but are not limited to $C_6$-$C_{22}$ alkyl dialkyl betaines, such as fatty dimethyl betaines (R—N(CH$_3$)$_2$($^+$)—CH$_2$COO—), obtained from a $C_6$-$C_{22}$ alkyl dimethyl amine which is reacted with a monohaloacetate salt (e.g., sodium monochloroacetate), such as $C_{12}$-$C_{14}$ dimethyl betaine (carboxylate methyl $C_{12}$-$C_{14}$ alkyl dimethylammonium); $C_6$-$C_{22}$ alkyl amido betaines (R—CO—NH—CH$_2$CH$_2$CH$_2$—N(CH$_3$)$_2$($^+$)—CH$_2$COO— or R—CO—NH—CH$_2$CH$_2$—N(CH$_3$)$_2$($^+$)—CH$_2$COO—), obtained by the reaction of a monohaloacetate salt (e.g., sodium monochloroacetate) with the reaction product of either dimethyl amino propylamine or dimethyl amino ethylamine with a suitable carboxylic acid or ester derivatives thereof, such as $C_{10}$-$C_{18}$ amidopropyl dimethylamino betaine; $C_6$-$C_{22}$ alkyl sultaines or $C_6$-$C_{22}$ alkyl amido sultaines, which are similar to those $C_6$-$C_{22}$ alkyl dialkyl betaines or $C_6$-$C_{22}$ alkyl amido betaines described above except in which the carboxylic group has been substituted by a sulfonic group (R—N(CH$_3$)$_2$($^+$)—CH$_2$CH$_2$CH$_2$SO$_3$— or R—CO—NH—CH$_2$CH$_2$CH$_2$—N(CH$_3$)$_2$($^+$)—CH$_2$CH$_2$CH$_2$SO$_3$— or R—CO—NH—CH$_2$CH$_2$—N(CH$_3$)$_2$($^+$)—CH$_2$CH$_2$CH$_2$SO$_3$—) or a hydroxysulfonic group (R—N(CH$_3$)$_2$($^+$)—CH$_2$CH(OH)—CH$_2$SO$_3$— or R—CO—NH—CH$_2$CH$_2$CH$_2$—N(CH$_3$)$_2$($^+$)—CH$_2$CH(OH)—CH$_2$SO$_3$— or R—CO—NH—CH$_2$CH$_2$—N(CH$_3$)$_2$($^+$)—CH$_2$CH(OH)—CH$_2$SO$_3$—), such as $C_{10}$-$C_{18}$ dimethyl hydroxysultaine and $C_{10}$-$C_{18}$ amido propyl dimethylamino hydroxysultaine; and mixtures thereof.

Suitable examples of chelating agents useful as sequestration agents of metal ions include, but are not limited to, iron control agents, such as ethylene diamine tetra acetic acid (EDTA), diethylene triamine pentaacetic acid (DPTA), hydroxyethylene diamine triacetic acid (HEDTA), ethylene diamine di-ortho-hydroxy-phenyl acetic acid (EDDHA), ethylene diamine di-ortho-hydroxy-para-methyl phenyl acetic acid (EDDHMA), ethylene diamine di-ortho-hydroxy-para-carboxy-phenyl acetic acid (EDDCHA), and the like. Suitable examples of gel stabilizers/stabilizing agents include, but are not limited to, polypropylene glycol, polyethylene glycol, carboxymethyl cellulose, hydroxyethyl cellulose, polysiloxane polyalkyl polyether copolymers, acrylic copolymers, alkali metal alginates and other water-soluble alginates, carboxy vinyl polymers, polyvinylpyrrolidone, polyacrylates, and the like.

Suitable examples of dispersing agents include, but are not limited to, polymeric or co-polymeric compounds of polyacrylic acid, polyacrylic acid/maleic acid copolymers, styrene/maleic anhydride copolymers, polymethacrylic acid, polyaspartic acid, and the like.

Suitable examples of corrosion inhibitors include, but are not limited to, alkoxylated fatty amines, chromates, zinc salts, (poly)phosphates, organic phosphorus compounds (phosphonates), acetylenic alcohols, such as propargylic alcohol, α,β-unsaturated aldehydes such as cinnameldehyde and crotonaldehyde, aromatic aldehydes, such as furfural, p-anisaldehyde, phenones including alkenyl phenones, such as phenyl vinyl ketone, nitrogen-containing heterocycles, such as imidazolines, piperazines, hexamethylene tetramines, quaternized heteroarenes, such as 1-(benzyl) quinolinium chloride, and condensation products of carbonyls and amines, such as Schiff bases, and the like.

Suitable examples of scale inhibitors include, but are not limited to, sodium hexametaphosphate, sodium tripolyphosphate, hydroxy ethylidene diphosphonic acid, aminotris(m-ethylenephosphonic acid (ATMP), vinyl sulfonic acid, allyl sulfonic acid, polycarboxylic acid polymers, such as polymers containing 3-allyloxy-2-hydroxy-propionic acid monomers, sulfonated polymers, such as vinyl monomers having a sulfonic acid group, polyacrylates, and co-polymers thereof.

Suitable examples of defoaming agents include, but are not limited to, silicone oils, silicone oil emulsions, organic defoamers, emulsions of organic defoamers, silicone-organic emulsions, silicone-glycol compounds, silicone/silica adducts, emulsions of silicone/silica adduct, and the like. Suitable examples of emulsifiers include, but are not limited to, a tallow amine, a ditallow amine, or combinations thereof, for example, a 50% concentration of a mixture of tallow alkyl amine acetates, C16-C18 (CAS 61790-60) and ditallow alkyl amine acetates (CAS 71011-03-5) in a suitable solvent, such as heavy aromatic naphtha and ethylene glycol; as well as mixtures thereof.

In some embodiments, the first injection fluid, the second injection fluid, and/or the third injection fluid is free of an additive (e.g., viscosity modifying agent, a chelating agent, a stabilizing agent, a dispersing agent, a corrosion inhibitor, a scale inhibitor, a stabilizing agent, a defoaming agent, and an emulsifier).

EXAMPLES

The following examples demonstrate the recovery of oil from the hydrocarbon-bearing subterranean geologic formation. The examples are provided solely for illustration and are not to be construed as limitations of the present disclosure, as many variations thereof are possible without departing from the spirit and scope of the present disclosure.

Example 1: Polymer System Formulation

As the present disclosure involves the injection of viscous and viscoelastic polymers, the polymers with low and high molecular weight (MW) are used. The composition of the brine solutions used in the preparation of polymer solutions (or the injection fluids) is provided in Table 1. The polymer's nature, MW, concentration, and salinity are provided in Table 2.

TABLE 1

Composition of synthetic brine

| Salts | Concentration (mg/L) |
|---|---|
| NaCl | 3115 |
| NaHCO$_3$ | 1310 |
| Na$_2$SO$_4$ | 239 |
| KCl | 54 |
| CaCl$_2$•2 H$_2$O | 96 |
| MgCl$_2$•6 H$_2$O | 93 |
| Total | 4907 |

TABLE 2

Viscous and viscoelastic properties of enhanced oil recovery (EOR) polymer systems

| Polymer system | Shear viscosity at 1.17 s$^{-1}$, 12.7 s$^{-1}$ and 28.1 s$^{-1}$, cP | Shear thickening index |
|---|---|---|
| 6000 ppm 3.6 MDa HPAM 3130 | 166.16, 108.23, and 83.4 | 0 |
| 1300 ppm 20 MDa HPAM 3630 | 64.19, 25.05, and 18.26 | 1.35 |
| 640 ppm 35 MDa HPAM 6035 | 31.85, 13.36, and 10.04 | 1.35 |
| 2500 ppm 20 MDa HPAM 3630 | 269.64, 75.9, and 50.4 | 1.32 |
| 3000 ppm 20 MDa HPAM 3630 | 602.48, 136.67, and 87.02 | 1.22 |
| 14000 ppm 3.6 MDa HPAM 3130 | 1787.9, 682.34, and 445.86 | 0 |

Example 2: Rheology

Rheological experiments use a steady-shear rheometer to characterize the polymer's viscous and viscoelastic behavior. Viscosity can be characterized by steady shear-rheometry [Delshad, M., Kim., D. H., Magbagbeolo, O. A. et al. 2008. Mechanistic Interpretation and Utilization of Viscoelastic Behavior of Polymer Solutions for Improved Polymer-Flood Efficiency. *Presented at SPE Improved Oil Recovery Efficiency Symposium*, Tulsa, 24-28th April. SPE-113620-MS; and Seright, R. S., Fan, T., Wavrik, K., et al. 2011. New insights into polymer rheology in porous media. *SPE Journal*, 16 (01), 35-42. SPE 129200-PA, both of which are incorporated herein by reference in their entireties]. While the conventional notion is that steady shear rheometry can characterize only the viscosity and shear thinning, it has been demonstrated that the non-linear viscoelasticity of EOR polymer systems can be characterized by steady shear rheometry [Azad, M. S. 2022. Characterization of non-linear viscoelastic properties of EOR polymer systems using steady shear rheometry. *SPE Journal*, 1-19. SPE 212824-PA, incorporated herein by reference in its entirety]. The shear thickening index is a parameter that can quantify the non-linear viscoelasticity [Jafar, H., Azad, M. S., Farhan, M., Al-Shehri, D and Barri, A. 2023. Does Non-circular geometry amplifies the non-linear viscoelastic effects for an improved polymer EOR selection criteria? 48, 17089-17101. Arabian Journal of Science and Engineering, incorporated herein by reference in its entirety].

Example 3: Core Flood

Four polymer core flood experiments are performed with polymers of varying rheology.
  a) In experiment 1, a viscous flood was followed by a viscoelastic flood and then followed by a viscoelastic slug with slightly reduced viscosity than the second slug.
  b) In experiment 2, a viscoelastic flood was followed by a viscous flood and then followed by a viscoelastic slug with higher elasticity and viscosity than the first slug.
  c) In experiment 3, a viscoelastic flood was followed by a viscous flood and then followed by the first slug again.
  d) In experiment 4, experiment 3 is repeated, in which a viscoelastic flood was followed by a viscous flood and then followed by the first viscoelastic slug.

All four experiments use a Berea core with a permeability of around 200 millidarcy (mD). The permeability of the cores is provided in Table 3. All the injections are performed at 1 ft/day.

TABLE 3

Permeability and porosity of the cores used in the experiments

| Cores | Porosity | Permeability, mD |
|---|---|---|
| Core 1 | 0.209 | 172 |
| Core 2 | 0.219 | 210 |
| Core 3 | 0.21 | 210 |
| Core 4 | 0.207 | 199 |

Results and Discussion
Rheology:

Rheological results of the formulated less elastic, high viscous polymer systems and more elastic, less viscous polymer systems are provided in Table 2. The results include the shear viscosity at the lower shear rates, representative of viscosity, and the shear thickening index, representative of elasticity. Lesser elastic systems are those characterized by low MW (HPAM 3130) and high concentration. HPAM 3130 at 6000 ppm provided a shear viscosity of 166.16 cP, 108.23 cP, and 83.4 cP at the shear rate of 1.17 s$^{-1}$, 12.7 s$^{-1}$, and 28.1 s$^{-1}$, respectively. At these shear rates, HPAM 3130 at 14000 ppm has a higher shear viscosity of 1787.9 cP, 682.34 cP, and 445.86 cP. For low MW HPAM 3130 at both concentrations, shear thickening is not evident (0), which indicates that they are not elastic. This is consistent with other low MW polymers coupled with a high concentration leading to lower elasticity [Clarke, M., et al. 2016. How viscoelastic polymer flooding enhances displacement efficiency? *SPE Journal*, 21 (03): 0675-0687. SPE 174654-PA; and Azad, M. S. 2019. Improved Quantification of viscoelastic effects during polymer flooding using an extensional rheometer. Ph.D. dissertation. University of Alberta, Canada, both of which are incorporated herein by reference in their entireties]. HPAM 3630 at a concentration of 1300 ppm leads to shear viscosities of 64.19 cP, 25.05 cP, and 18.26 cP at 1.17 s$^{-1}$, 12.7 s$^{-1}$, and 28.1 s$^{-1}$, respectively. The shear viscosity values of HPAM 3630 at 2500 ppm are 269.64 cP, 75.9 cP, and 50.4 cP, for the shear rates 1.17 s$^{-1}$, 12.7 s$^{-1}$, and 28.1 s$^{-1}$, respectively. The shear viscosity values for HPAM 3630 at 3000 ppm are 602.48 cP, 136.67 cP, and 87.02 cP, for the shear rates 1.17 s$^{-1}$, 12.7 s$^{-1}$, and 28.1 s$^{-1}$, respectively. An increase in concentration leads to increased shear viscosity at various shear rates; however, the shear thickening index decreases with respect to an increase in concentration, signifying that a high concentration inhibits stretching. For the HPAM 6035 system at a concentration of 640 ppm, the measured shear viscosity values at the shear rate of 1.17 s$^{-1}$, 12.7 s$^{-1}$, and 28.1 s$^{-1}$ are 31.85 cP, 13.36 cP, and 10.04 cP, respectively. The shear thickening index for this system is 1.35. High MW polymers coupled with relatively lower concentrations leads to higher elasticity.

Figure 2:
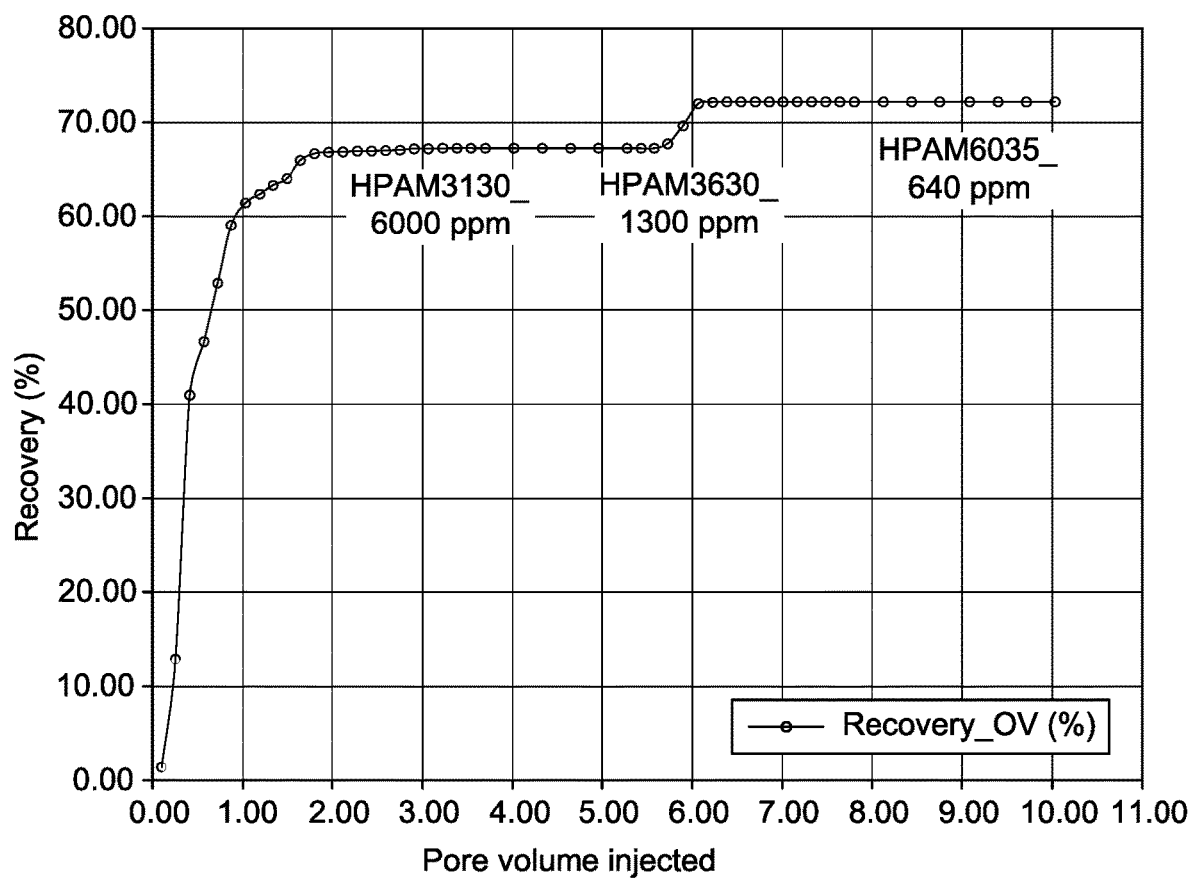
FIG. 2 is a graphical representation showing recovery factors as a function of pore volume (PV) for the sequential polymer flood performed using viscous 6000 ppm HPAM 3130, elastic 1300 ppm HPAM 3630, and 640 ppm HPAM 6035, according to certain embodiments.
Figure 3:
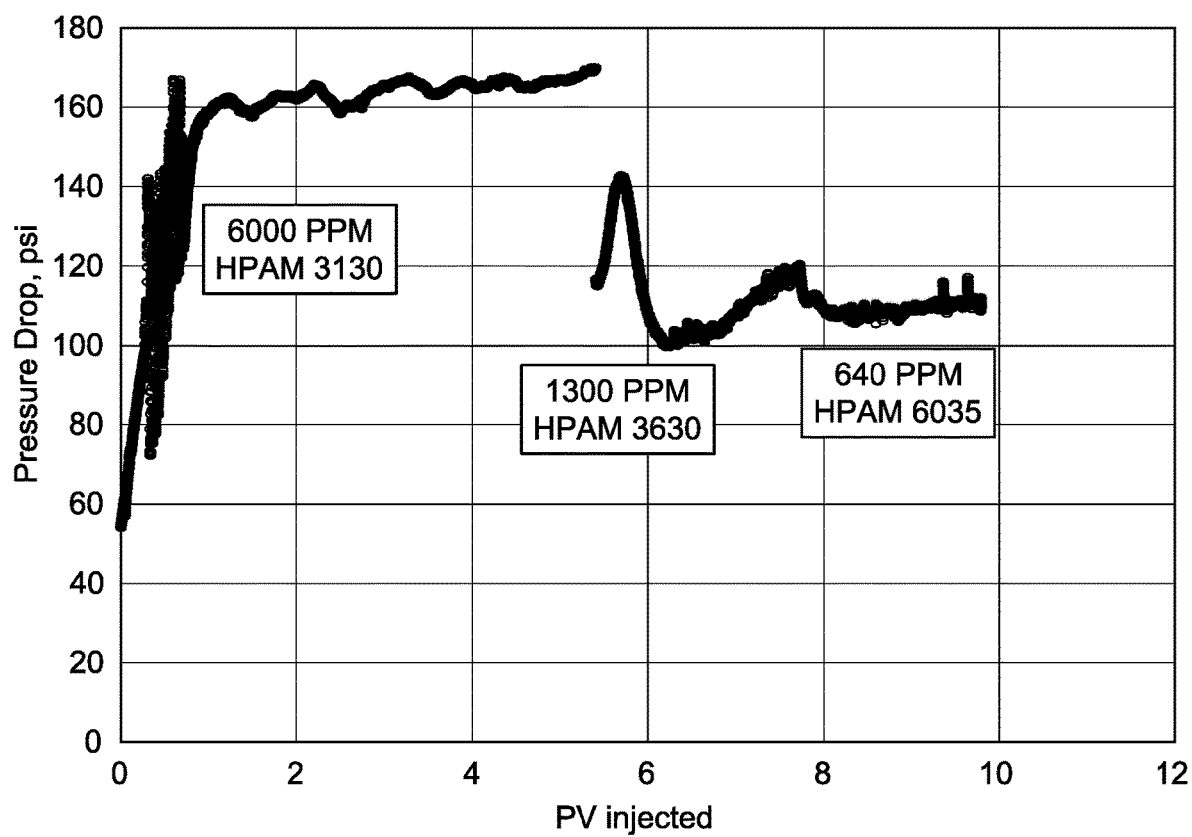
FIG. 3 is a graphical representation showing pressure drops as a function of PV for the sequential polymer flood performed using viscous 6000 ppm HPAM 3130, elastic 1300 ppm HPAM 3630, and 640 ppm HPAM 6035, according to certain embodiments.

Core Flooding:

The recovery and the corresponding pressure profile obtained for all four experiments are provided in FIG. 2 to FIG. 9. As can be seen in FIG. 2, injecting a viscoelastic slug (1300 ppm HPAM 3630) as the follow-up slug to a viscous slug (6000 ppm HPAM 3130) increases the recovery factor from 67.24% to 72.19%. However, the viscoelastic slug generates a lower pressure gradient when compared to the viscous slug (FIG. 3). This could be attributed to the higher residual oil recovery due to the size-based rheological effect even at the lower-pressure gradient (FIG. 3). Several studies have reported this similar behavior, that the viscoelastic slug could recover oil more than expected from the viscous behavior and pressure gradient [Azad, M. S., and Trivedi, J. J. 2021. Quantification of Sor Reduction during Polymer Flooding using Extensional Capillary Number. *SPE Journal.* 26(03):1469-1498. SPE 204212-PA; Azad, M. S., and Trivedi, J. J. 2020a. Extensional effects during viscoelastic polymer flooding: Understanding the unresolved challenges, *SPE Journal,* 25 (04): 1827-1841. SPE 201112-PA; and Azad, M. S., and Trivedi, J. J. 2020b. Does polymer viscoelasticity influence heavy oil sweep efficiency and injectivity at 1 ft/day. *SPE Reservoir Evaluation and Engineering.* 23(02):446-462, each of which are incorporated herein by reference in their entireties]. In the third slug, a viscoelastic slug with similar elasticity and lower viscosity (HPAM 6035 at 640 ppm) is injected, and no oil recovery was observed. This implies that continuously injecting a viscoelastic slug does not increase the viscosity or recover additional oil.

Figure 4:
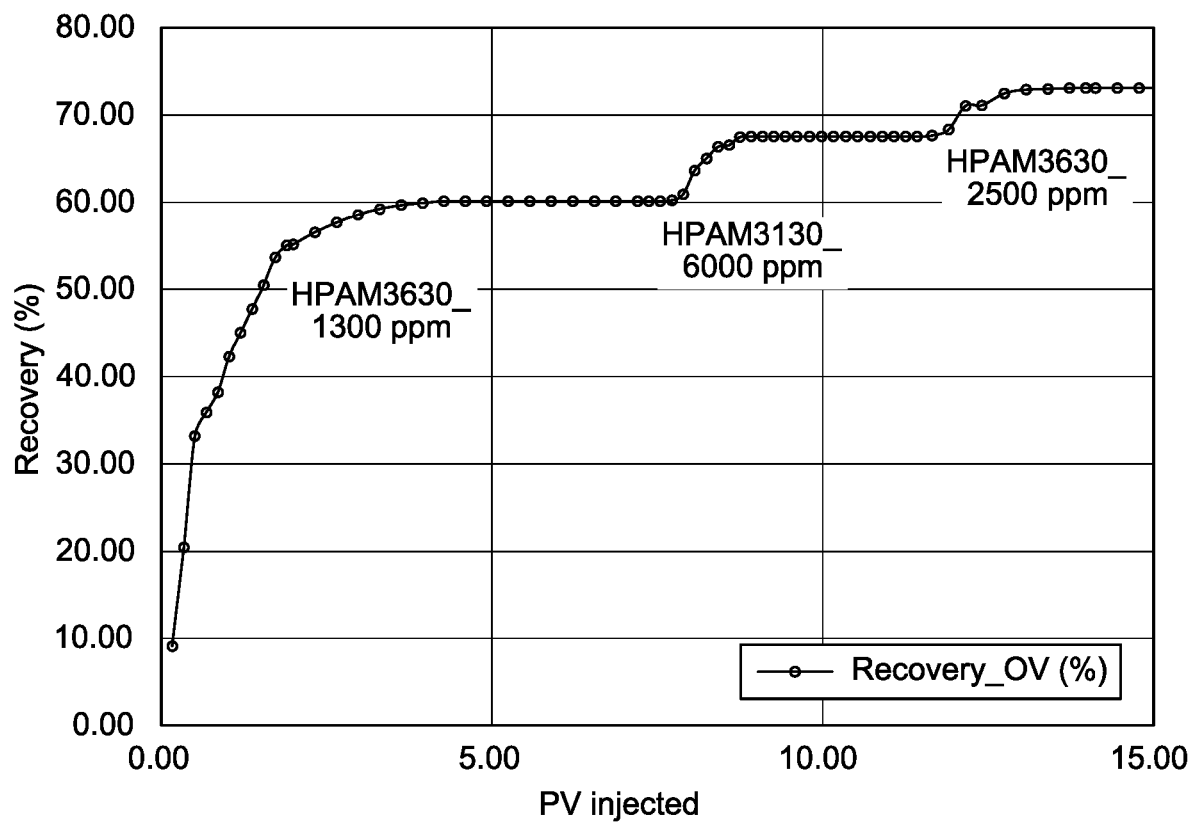
FIG. 4 is a graphical representation showing recovery factors as a function of PV for the sequential polymer flood performed using elastic, less viscous 1300 ppm HPAM 3630, purely viscous 6000 ppm HPAM 3130, and elastic-high viscous 2500 ppm HPAM 6035, according to certain embodiments.
Figure 5:
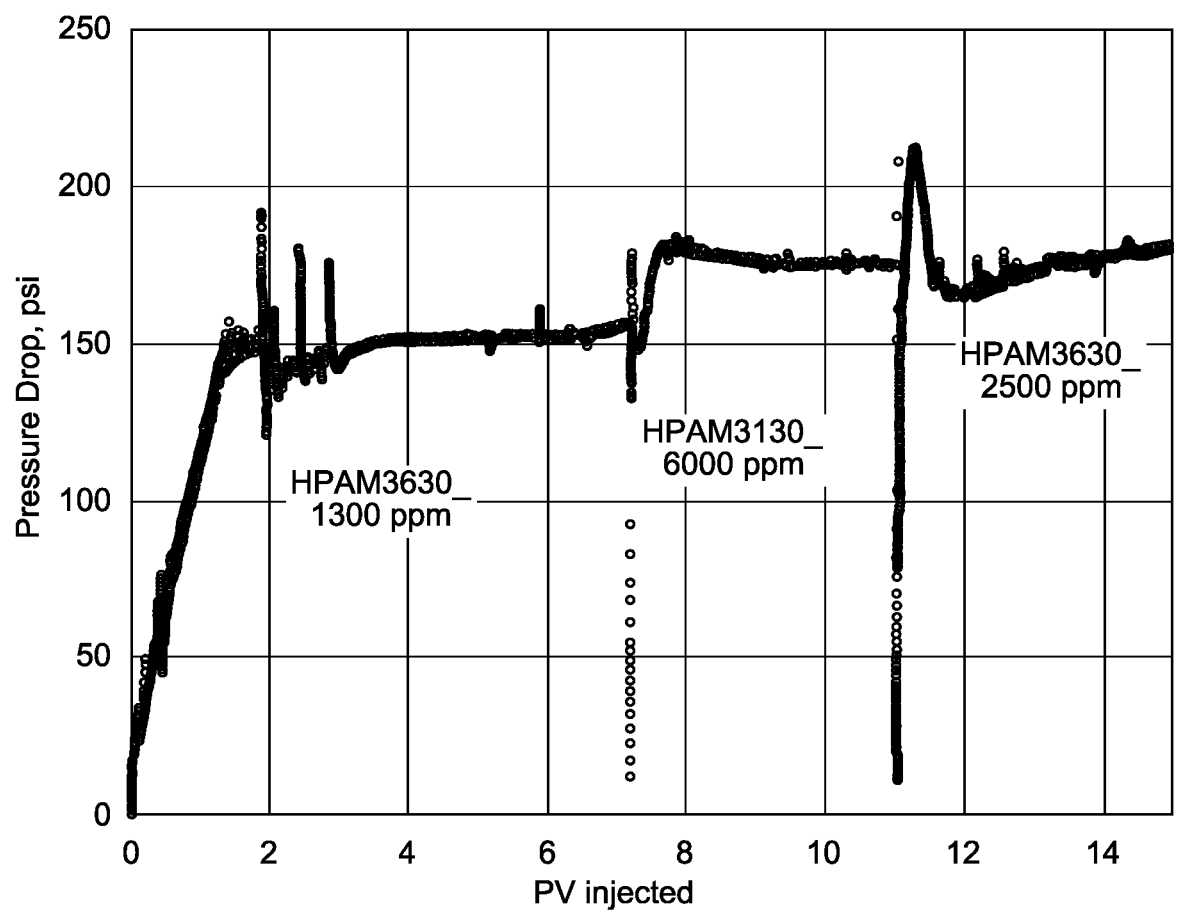
FIG. 5 is a graphical representation showing pressure drops as a function of PV for the sequential polymer flood performed using elastic, less viscous 1300 ppm HPAM 3630, purely viscous 6000 ppm HPAM 3130, and elastic-high viscous 2500 ppm HPAM 6035, according to certain embodiments.

Experiment 2 is conducted by injecting a viscoelastic slug (HPAM 3630 at 1300 ppm) initially (FIG. 4). It is clear that initial injection of the viscoelastic slug results in a lower recovery factor of 60% when compared to the primary recovery factor of 67% achieved with the initial viscous injection in the experiment (FIG. 2). While it is generally known that a viscoelastic slug can recover more oil than a viscous slug, a viscous slug (HPAM 3130 at 6000 ppm) injection as a follow-up to the viscoelastic slug increases the recovery factor from 60% to 67.55% with a higher-pressure gradient (FIG. 5). Although no study has reported this behavior during polymer injection, it complies with the classical fractional flow theory that a better sweep is needed for recovering the oil. There is a distinction between microscopic displacement and linear sweep (or linear displacement) and the recovery of the un-swept oil during the preceding viscoelastic injection on injecting the viscous slug. It is worth noting that viscoelastic slugs possess lower viscosity and, hence, a lower pressure gradient and lower sweep. Injection of the viscoelastic slug HPAM 6035 at 2500 ppm as the third slug further improves recovery from 67.55% to 73.9%. This additional oil recovery is due to the enhanced residual oil mobilization due to the higher viscoelasticity of 2500 ppm HPAM 3630 over 6000 ppm HPAM 3130 (FIG. 4). The pressure gradient during 2500 ppm HPAM 3630 is comparable to the pressure gradient generated during the preceding 6000 ppm HPAM 3130 injection (FIG. 5)—suggesting if injecting the same third slug as the first slug to determine if varying the rheology by creating a viscoelastic-viscous-viscoelastic gradient and will further improve the oil recovery. Therefore, experiments 3 and 4 were conducted.

Figure 6:
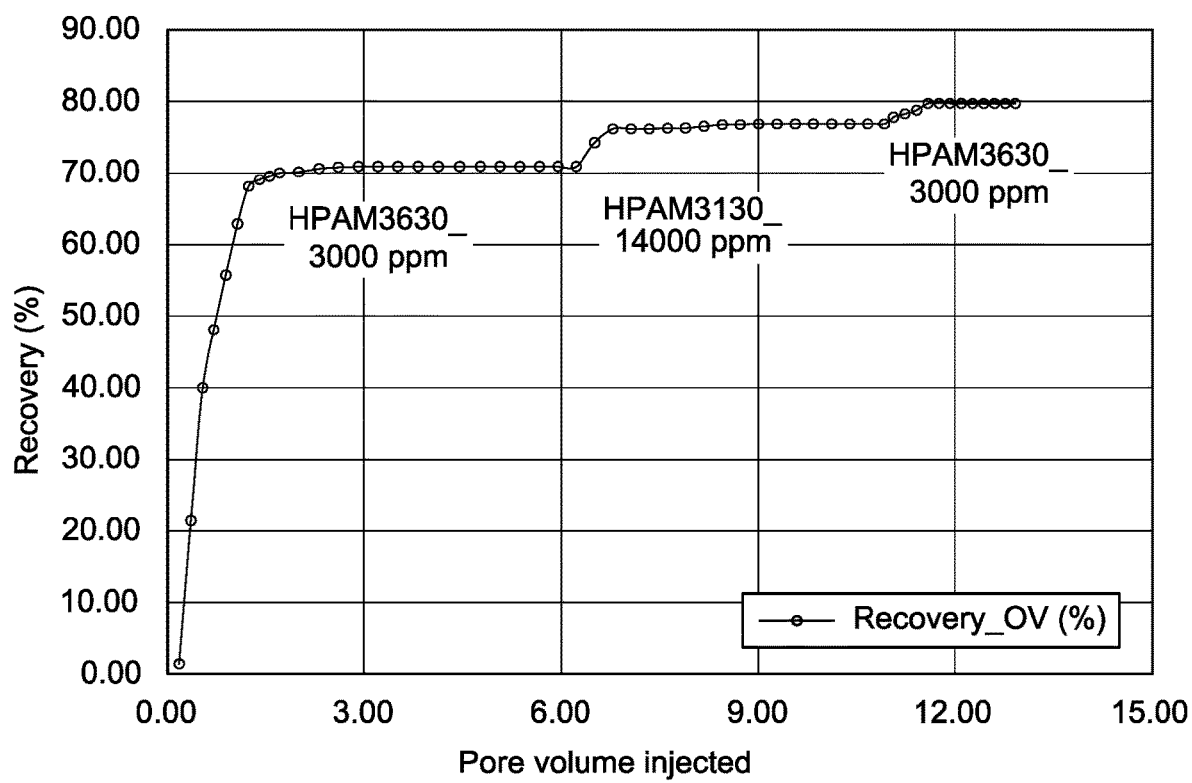
FIG. 6 is a graphical representation showing recovery factors as a function of PV for the sequential polymer flood performed using elastic, less viscous 3000 ppm HPAM 3630, purely viscous 14000 ppm HPAM 3130, and elastic 3000 ppm HPAM 3630, according to certain embodiments.
Figure 7:
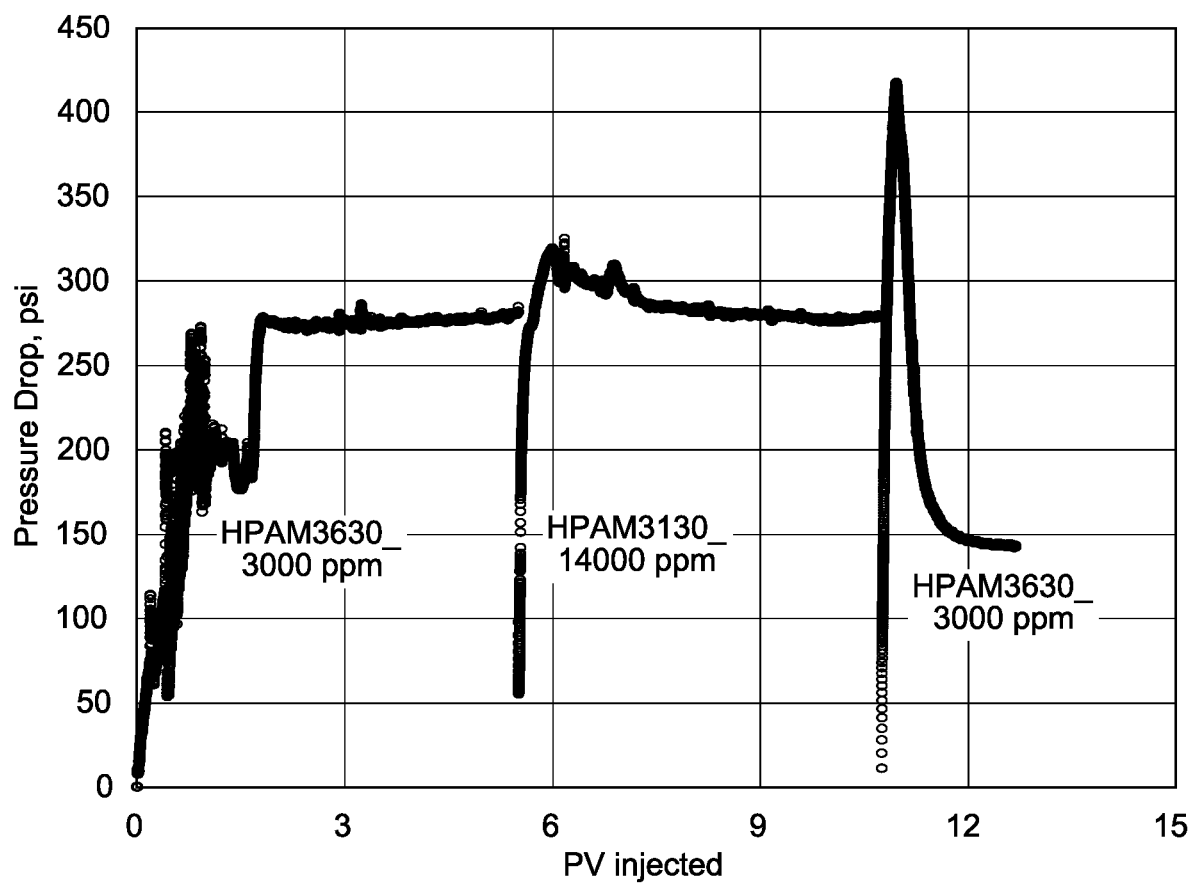
FIG. 7 is a graphical representation showing pressure drops as a function of PV for the sequential polymer flood performed using elastic, lesser viscous 3000 ppm HPAM 3630, purely viscous 14000 ppm HPAM 3130, and elastic 3000 ppm HPAM 3630, according to certain embodiments.

In experiment 3, 3000 ppm of viscoelastic HPAM 3630 was injected first. It resulted in a recovery factor (RF) of 70.9% (FIG. 6). This is higher than the previous two cases. It can be understood that the higher the viscosity (from Table 2), the higher the RF initially. In experiment 3, 14000 ppm HPAM 3130 with higher viscosity and negligible elasticity is injected as the second slug, further improving the recovery factor to 76.86%. Additional recovery could be attributed to the higher sweep caused by higher viscosity. Table 2 indicates 14000 ppm HPAM 3130 possesses the highest viscosity of 1787.9 cP, 682.34 cP, and 445.86 cP at the shear rates of 1.17 s$^{-1}$, 12.7 s$^{-1}$, and 28.1 s$^{-1}$, respectively, and the pressure gradient is a bit higher. Injecting viscoelastic HPAM 3630 at a concentration of 3000 ppm again increases the recovery factor further to 79.71%. Additionally, the third viscoelastic HPAM 3630 resulted in a reduced pressure gradient when compared to the previous slug injections (FIG. 7). This additional oil could be attributed to higher non-linear viscoelastic of HPAM 3630 emanating due to the size effect in the porous media. The 3000 ppm viscoelastic HPAM 3630 polymer, when injected as a third slug, reduced stabilized pressure compared to its injection as the primary slug (FIG. 7); however, a peak in pressure is noticed during the injection of the third slug. This is possibly due to the difficulty the third slug encounters while mobilizing the discontinuous oil and trapped residual oil. Once the oil becomes trapped, relative permeability of oil goes very low or zero and, therefore, a high pressure is generated to mobilize the oil at the same flux rate; however, after the peak, the pressure stabilized to a lower value. All the experiments were performed at the constant flux rate of 1 ft/day. The additional recovery obtained from viscoelastic HPAM 3630 could be attributed to increased residual oil recovery. The rheological gradient indicates that injecting HPAM 3630 as the first slug has a limit in recovering the oil (70% in the third experiment); however, induction of a rheological gradient by injection of viscous slug between the first and second viscoelastic HPAM 3630 injection ensures the oil is swept thoroughly, thereby creating an opportunity for the third HPAM injection to produce the well-swept residual oil. As oil recovery efficiency is a product of sweep and microscopic displacement, increased recovery of residual oil with an efficient sweep increases the recovery factor to around 80%.

Figure 8:
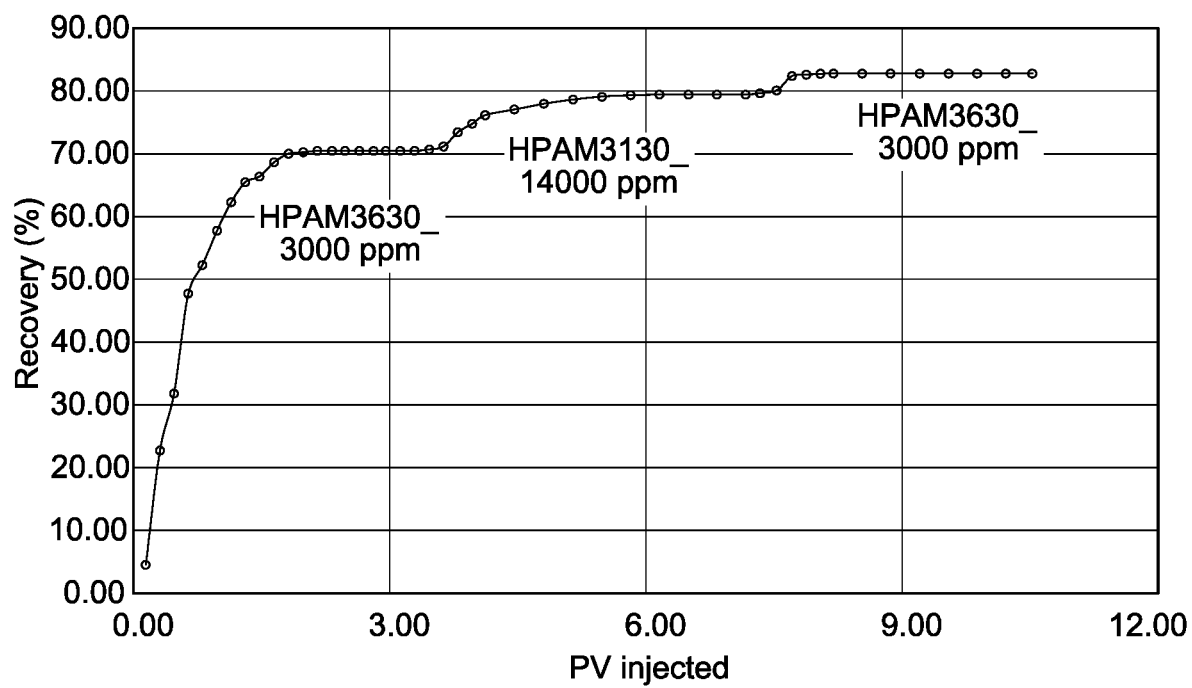
FIG. 8 is a graphical representation showing recovery factors as a function of PV for the sequential polymer flood performed using elastic, less viscous 3000 ppm HPAM 3630, purely viscous 14000 ppm HPAM 3130, and elastic 3000 ppm HPAM 3630, according to certain embodiments.
Figure 9:
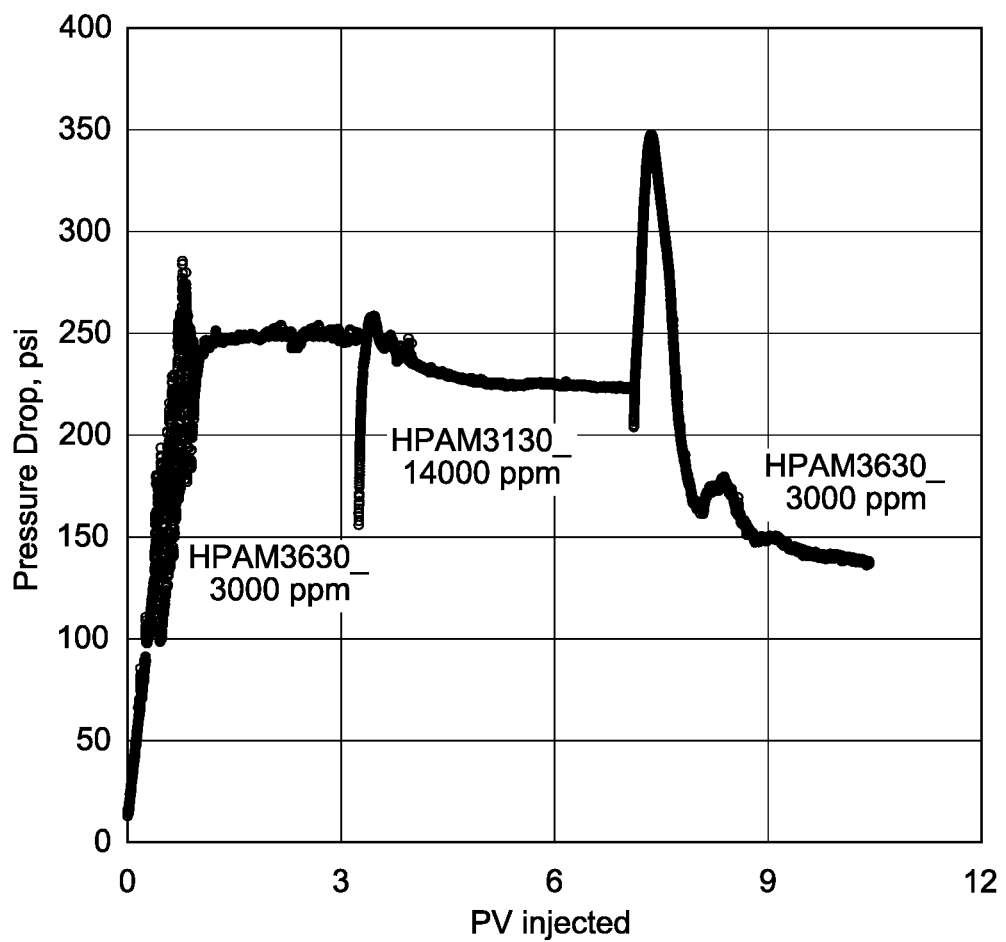
FIG. 9 is a graphical representation showing pressure drops as a function of PV for the sequential polymer flood performed using elastic, less viscous 3000 ppm HPAM 3630, purely viscous 14000 ppm HPAM 3130, and elastic 3000 ppm HPAM 3630, according to certain embodiments.

FIG. 8 and FIG. 9 depict the recovery and pressure profile of experiment 4, which is a repeat of experiment 3. The recovery trend is similar. Injecting a viscoelastic slug (3000 ppm HPAM 3630), followed by a viscous slug (14000 ppm HPAM 3130), and then followed by the same viscoelastic slug (3000 ppm HPAM 3630) improves the overall performance of polymer flood. While the first viscoelastic slug resulted in a recovery factor of 70.45%, the same slug injected after injecting a viscous slug (14000 ppm HPAM 3130) resulted in an overall recovery factor of 82.77%. The pressure profile is also similar in experiment 3 (FIG. 7) and experiment 4 (FIG. 9), except that during the injection of viscous slug (14000 ppm HPAM 3130), the pressure drop is slightly lower than the first slug injection in experiment 4 (FIG. 9); whereas the pressure drop during viscous slug injection (14000 ppm HPAM 3130) is slightly higher than the pressure drop during the first viscoelastic injection in experiment 3 (FIG. 7). A slightly higher recovery of 79% is seen with viscous injection in the experiment 4. A higher recovery of oil indicates a lesser pressure drop during propagation; therefore, the pressure drop is slightly on the lower side in experiment 4. The third slug injections, however, in experiments 3 and 4 have similar pressure peaking due to mobilization of trapped, discontinuous residual oil due to size-effect induced viscoelasticity and stabilization. This trapped oil mobilization is made possible by the second viscous slug injection, which ensures an adequate sweep. This confirms that the rheological gradient induction between viscoelasticity and viscosity during polymer EOR enhances the overall recovery factor.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of recovering oil from a hydrocarbon-bearing subterranean geologic formation, the method comprising:
producing a first hydrocarbon composition from the hydrocarbon-bearing subterranean geologic formation;
injecting a first injection fluid comprising a first viscoelastic polymer and a first brine solution into the hydrocarbon-bearing subterranean geologic formation,
wherein the first viscoelastic polymer has a shear viscosity from 500 to 700 cP at a shear rate of 0.5 to 2 s$^{-1}$,
producing a second hydrocarbon composition from the hydrocarbon-bearing subterranean geologic formation;
injecting a second injection fluid comprising a viscous polymer and a second brine solution into the hydrocarbon-bearing subterranean geologic formation,
wherein the viscous polymer has a shear viscosity greater than the first viscoelastic polymer,
producing a third hydrocarbon composition from the hydrocarbon-bearing subterranean geologic formation;
injecting a third injection fluid comprising a second viscoelastic polymer and a third brine solution into the hydrocarbon-bearing subterranean geologic formation,
wherein the second viscoelastic polymer has a shear viscosity less than the viscous polymer,
producing a fourth hydrocarbon composition from the hydrocarbon-bearing subterranean geologic formation.

2. The method of claim 1, wherein an oil recovery is from 65 to 85 percent by weight based on an amount of the hydrocarbon composition present in the hydrocarbon-bearing subterranean geologic formation before the injection of the first injection fluid.

3. The method of claim 1, wherein injecting the first injection fluid occurs before the hydrocarbon-bearing subterranean geologic formation stops producing the first hydrocarbon composition.

4. The method of claim 1, wherein injecting the second injection fluid does not occur until the injection of the first injection fluid stops producing the second hydrocarbon composition.

5. The method of claim 1, wherein injecting the third injection fluid does not occur until the injection of the second injection fluid stops producing the third hydrocarbon composition.

6. The method of claim 1, wherein the hydrocarbon-bearing subterranean geologic formation is a Berea sandstone.

7. The method of claim 6, wherein the Berea sandstone has a permeability of 150 to 250 mD.

8. The method of claim 6, wherein the Berea sandstone has a porosity of 0.200 to 0.225.

9. The method of claim 1, wherein the first injection fluid, second injection fluid, and third injection fluid is injected in a slug size of 2 to 15 pore volumes (PVs).

10. The method of claim 1, wherein an injection rate is 0.5 to 2 feet per day.

11. The method of claim 1, wherein the second viscoelastic polymer is the same as the first viscoelastic polymer.

12. The method of claim 1, wherein the first brine solution, the second brine solution, and the third brine solutions comprise sodium chloride, sodium bicarbonate, sodium sulfate, potassium chloride, calcium chloride, and magnesium chloride.

13. The method of claim 1, wherein the first viscoelastic polymer is a first hydrolyzed polyacrylamide with a molecular mass of 10 to 30 MDa.

14. The method of claim 13, wherein the first hydrolyzed polyacrylamide has a concentration of 2500 to 3500 ppm in the first brine solution.

15. The method of claim 13, wherein the viscous polymer is a second hydrolyzed polyacrylamide with a molecular mass of 2 to 5 MDa.

16. The method of claim 15, wherein the second hydrolyzed polyacrylamide has a concentration of 13,000 to 15,000 ppm in the second brine solution.

17. The method of claim 1, wherein the first viscoelastic polymer has a shear thickening index of 1.0 to 1.5 in the first brine solution.

18. The method of claim 1, wherein the viscous polymer has a shear thickening index of less than 0.2 in the second brine solution.

19. The method of claim 1, wherein the first viscoelastic polymer is hydrolyzed polyacrylamide 3630.

20. The method of claim 1, wherein the viscous polymer is hydrolyzed polyacrylamide 3130.

* * * * *